(12) United States Patent
Lalor

(10) Patent No.: US 6,708,649 B1
(45) Date of Patent: Mar. 23, 2004

(54) TARGET AND RETRIEVAL DEVICE

(76) Inventor: Tom Lalor, 122 Garden Ave., North Vancouver, BC (CA), V7P 3H2

( * ) Notice: Subject to any disclaimer, the term of this patent is extended or adjusted under 35 U.S.C. 154(b) by 0 days.

(21) Appl. No.: 10/423,256

(22) Filed: Apr. 25, 2003

(51) Int. Cl.[7] .................. A01K 29/00; A01M 31/06
(52) U.S. Cl. ............................................. 119/709; 43/2
(58) Field of Search .................. 119/707, 709; 43/2, 3; D22/125

(56) References Cited

U.S. PATENT DOCUMENTS

| | | | | |
|---|---|---|---|---|
| 741,526 | A | * 10/1903 | Mitchell | 43/2 |
| 4,223,636 | A | * 9/1980 | Dishong | 119/709 |
| 5,560,320 | A | * 10/1996 | Plunk | 119/709 |
| 5,706,762 | A | * 1/1998 | Dokken | 119/707 |
| 5,904,118 | A | * 5/1999 | Markham | 119/707 |
| 6,050,224 | A | * 4/2000 | Owens | 119/709 |
| 6,088,944 | A | * 7/2000 | Jones | 43/3 |
| 6,357,160 | B1 | * 3/2002 | Hackman et al. | 43/2 |
| 6,490,998 | B1 | * 12/2002 | Rocher | 119/707 |

* cited by examiner

*Primary Examiner*—Charles T. Jordan
*Assistant Examiner*—Elizabeth Shaw
(74) *Attorney, Agent, or Firm*—Andrus, Sceales & Sawall, LLP

(57) ABSTRACT

A target and retrieval device and method for training a hunter and a retrieving dog together in a simulated real-life hunting experience is described whereby the device comprises a main body portion formed of a durable material, the length and circumference of which is dimensioned to be releasably grasped within the mouth of a dog, and a secondary body portion closely secured to said main body portion, whereby said secondary body portion provides a visible signal when contacted by a gun shot and said main body portion survives the shot and is retrievable.

38 Claims, 1 Drawing Sheet

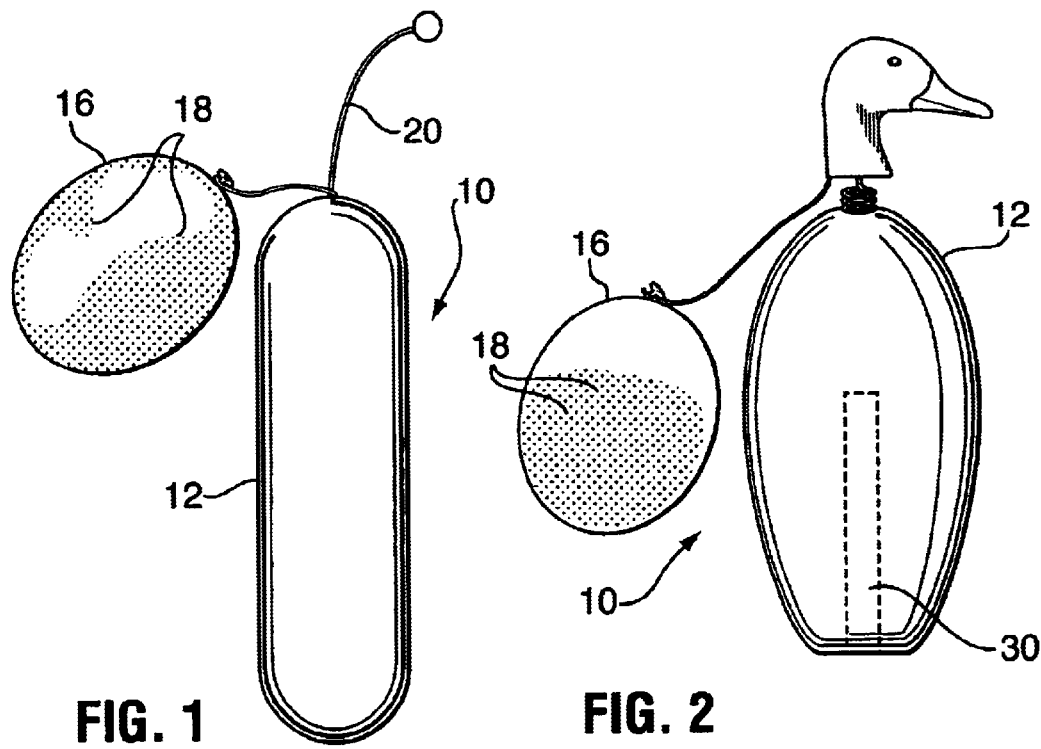
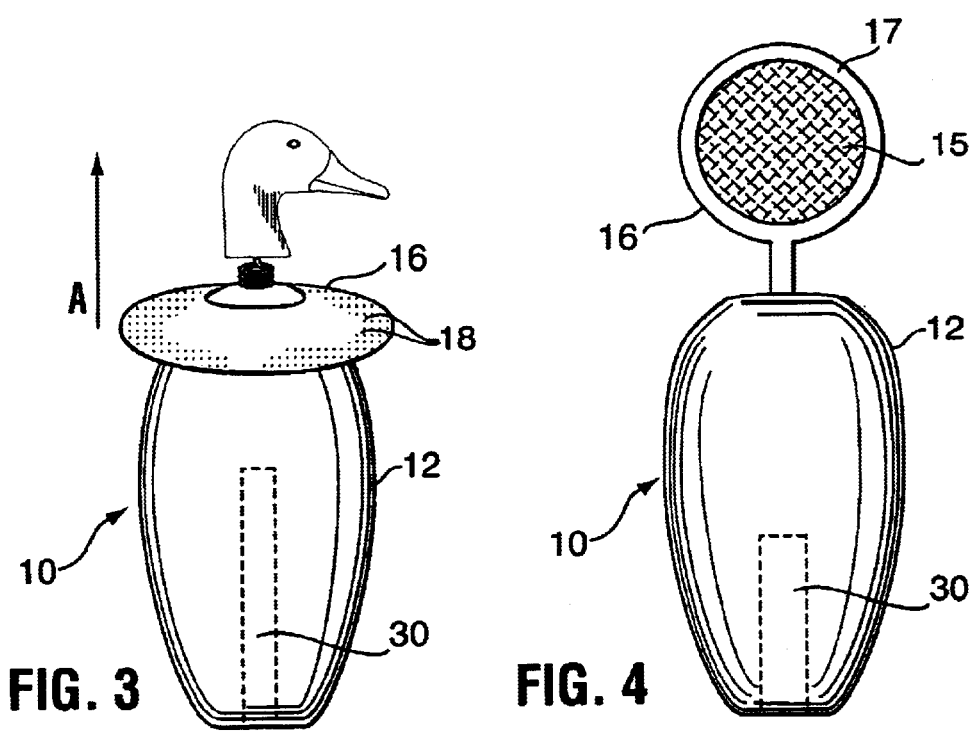

TARGET AND RETRIEVAL DEVICE

FIELD OF THE INVENTION

The present invention relates to animal training devices and to hunting target devices, and more particularly to animal retrieval devices such as retrieval dummies for use in training dogs to retrieve game birds on land and water, which include a visible target for hunters.

BACKGROUND OF THE INVENTION

Hunters have for a long time hunted game birds and used dogs for retrieving the downed birds. Hunters have been trained to shoot using many devices such as clay targets thrown from manual or automatic power throwers. When contacted by the gun shot, the clay breaks to give a visual indication that a successful hit has been made.

ND dogs have been trained with retrieval dummies thrown manually or launched from power launchers. In some cases, the retrieval dummies are formed into the likeness of a particular type of game bird to make the activity more realistic for the dog. In addition, some retrieval dummy launchers have been designed to produce a gun shot sound to further simulate the hunting experience and enhance the dog's training.

It is important that hunters and their dogs train together as a team. It would therefore be advantageous if a device was developed to allow both the hunter and the dog to train together under circumstances which better simulate the real-life hunting experience.

BRIEF SUMMARY OF THE INVENTION

The present invention overcomes the above shortcomings.

Briefly, the present invention provides a new and improved target and retrieval training device for training hunters to shoot game birds and dogs to retrieve downed game birds together as a team under realistic conditions. The device comprises a retrieval dummy, which comprises a main body portion and a secondary body portion, wherein the purpose of the secondary body portion is to signal to the hunter shooting at the retrieval dummy that it has been successfully hit, and the purpose of the main body portion is to survive the shot and be retrievable by the dog. Preferably, the retrieval dummy can be thrown manually or launched from a power launcher in a realistic manner.

It is therefore an object of one aspect of the present invention to provide a new and improved target and retrieval device for training both hunters and dogs together as a team in which a secondary body portion of the device serves to signal to a shooter that a hit has been made, and a main body portion of the device survives the hit and is retrievable by the dog.

It is an object of another aspect of the invention to provide a target and retrieval device as described above that can be thrown manually or launched from a power launcher in a realistic manner.

It is a further object of the present invention to provide a method for training a hunter and a retrieving dog together in a simulated real-life hunting experience using a target and retrieval device as described above.

According to one aspect of the present invention, there is provided a target and retrieval device comprising: a main body portion formed of a durable material, the length and circumference of the main body portion being dimensioned to be releasably grasped within the mouth of a dog; and a secondary body portion secured to the main body portion, whereby the secondary body portion provides a visible signal when contacted by a shot from a gun, and the main body portion survives the shot and is retrievable.

According to another aspect of the present invention, there is provided a target and retrieval device comprising: a main body portion formed of a durable material, the length and circumference of the main body portion being dimensioned to be releasably grasped within the mouth of a dog; and a secondary body portion closely secured to the main body portion, wherein the secondary body portion is made of a material which will break when contacted by a shot from a gun, thus providing a visible signal, and the main body portion survives the shot and is retrievable.

According to a further aspect of the present invention, there is also provided a method for training a hunter and a retrieving dog together in a simulated real-life hunting experience comprising the steps of: providing a target and retrieval device comprising: a main body portion formed of a durable material, the length and circumference of the main body portion being dimensioned to be releasably grasped within the mouth of a dog; and a secondary body portion affixed to the main body portion, the secondary body portion able to provide a visible signal when contacted by a shot from a gun, and the main body portion able to survive the shot and be retrievable; throwing or launching the target and retrieval device; shooting at the target and retrieval device with a gun so as to cause the secondary body portion to provide the visual signal when successfully hit by the gun shot; and causing the main body portion to be retrieved.

One advantage of the present invention is that it facilitates the training of hunters and their dogs together as a team under realistic conditions that simulate hunting for game birds. A further advantage of the present invention is that it can be thrown manually or launched from a power launcher. Another advantage of the invention is that it provides both a signal to the hunter that the target has been hit, and a retrieval device that survives the shot and can be retrieved by a dog.

Further objects and advantages of the present invention will be apparent from the following description, wherein various embodiments of the invention are clearly described and shown.

BRIEF DESCRIPTION OF THE DRAWINGS

In drawings that illustrate the present invention by way of example:

FIG. 1 is a side view of one embodiment of the target and retrieval device of the present invention.

FIG. 2 is a side, partially sectional view, of another embodiment of the target and retrieval device of the present invention having a main body portion that is formed into the likeness of a game bird.

FIG. 3 is a side, partially sectional view, of a further embodiment of the target and retrieval device of the present invention showing the secondary body portion frictionally secured to the main body portion.

FIG. 4 is a side, partially sectional view, of another embodiment of the target and retrieval device of the present invention showing an alternate form of the secondary body portion, which is rigidly secured to the main body portion.

DETAILED DESCRIPTION OF THE INVENTION

Referring to FIGS. 1 through 4, there is shown a target and retrieval device 10 comprising an elongated cylindrical main body portion 12, being dimensioned to be releasably grasped within the mouth of a dog, and a secondary body portion 16 secured closely to main body portion 12, for example, rigidly fixed (see FIG. 4), tied with a rope (see FIGS. 1 and 2) or secured frictionally (see FIG. 3).

The main body portion 12 is generally unitary and formed of a material that will remain substantially intact during the course of demanding and repeated use and contact by gun shots. Materials that can be used to form the body 12 preferably also provide a combination of such properties as weight, moldability, waterproof, buoyant, rigidity, flexibility, cost, non-toxicity, and tear and impact resistance. An example, without being restrictive, of a suitable material would include a moldable foamed polyurethane which is commercially available.

Main body portion 12 may include a cavity (not shown), which may optionally contain a buoyant material, which may be a closed cell foam insert substantially filling the cavity and substantially resistant to deformation of the cylindrical body portion 12, and optionally a length of rope 20 affixed to the main body portion 12 at one end thereof for use in throwing the device 10.

Secondary body portion 16, functions as an indicating mechanism to provide a visible signal to a hunter shooting at device 10 with a gun that the device 10 has been successfully hit by the gun shot. Secondary body portion 16 can be any suitable apparatus, which when contacted by the hunter's shot will visually signal to the hunter that target and retrieval device 10 has been hit. For example, in one embodiment of the invention, secondary body portion 16 is advantageously an inflatable balloon (see FIGS. 1 and 2). When the balloon is inflated and then contacted by the gun shot, the balloon breaks, thus indicating a successful hit. Optionally, the balloon may contain a powder 18, which will scatter when the balloon breaks, thus better marking the hit and making it more visible to the hunter. The powder 18 may be white or coloured, as desired. The balloon may be formed of rubber or latex, or any other material commonly used to manufacture balloons and which will break on impact by a gun shot.

In another embodiment, secondary body portion 16 can be made of any suitable breakable material, such as clay, which when contacted by the gun shot, breaks to visually indicate to the hunter that device 10 has been successfully hit. As shown in FIG. 4, secondary body portion 16 may comprise a clay target 15, held within a clay target holder 17, and rigidly attached to main body portion 12.

As shown in FIGS. 2 and 3, target and retrieval device 10 may be formed into the shape of a particular game bird to provide a more realistic exercise for the hunter and the dog.

Also referring to FIGS. 2, 3 and 4, device 10 may include an elongated launch tube 30, which will permit the device 10 to be launched from a power launcher such as the 0.22 calibre cartridge launchers sold under the trademark BUMPER BOY™, compressed air powered launchers, or propane powered launchers such as the MAX5000™. Optionally, device 10 may be launched by any suitable power launcher, such as spring powered launchers or rubber band powered launches known as wingers, or thrown manually using the optional rope 20 (see FIG. 1).

As shown in FIGS. 1, 2 and 4, secondary body portion 16 can be rigidly attached or secured closely to main body portion 12 using a rope or other suitable means of attachment. As shown in FIG. 3, secondary body portion 16 may be formed into a suitable shape that can be secured to main body portion 12 by a friction fit. In the illustrated embodiment in FIG. 3, secondary body portion 16 is formed generally into a toroid or donut-like shape. Due to the ovular shape of main body portion 12, secondary body portion 16, shaped in this manner, will remain frictionally secured, and will not become separated from main body portion 12, so long as device 10 is launched or thrown oriented in direction A. In one embodiment, secondary body portion 16 is an inflatable balloon formed into a toroid. The elasticity of the balloon will assist in the frictional attachment of secondary body portion 16 to main body portion 12. In other embodiments, secondary body portion 16 can be made of any suitable breakable material, such as clay, which can be formed into the necessary shape for frictionally securing to main body portion 12, and which when contacted by the gun shot, breaks to visually indicate to the hunter that device 10 has been successfully hit.

In operation, the target and retrieval device 10 is launched or thrown into the air and a hunter shoots at the device 10 with a gun. If the gun shot makes sufficient contact with secondary body portion 16, which is closely secured to main body portion 12, the secondary body portion 16 will break, scattering powder 18 or clay particles into the air and thus providing a visual signal to the hunter that device 10 has been hit. If secondary body portion 16 does not contain powder 18 or is not made of clay, the mere breaking of secondary body 16 will provide sufficient visual confirmation of a hit. Main body portion 12, which is designed to survive the gun shot intact, continues until it hits the ground or falls into water, whereupon it is retrieved by the dog. The invention advantageously facilitates the training of both the hunter and the dog together under circumstances which simulate the real-life hunting experience.

Also disclosed, is a method of training a hunter and a retrieving dog together in a simulated real-life hunting experience comprising the steps of: providing a target and retrieval device 10 as described herein; manually throwing device 10 or launching device 10 using a suitable power launcher; shooting at device 10 with a gun, so as to cause the secondary body portion 16 to provide a visual signal when successfully hit; and causing the main body portion 12, which has survived the shot, to be retrieved by a dog after it falls to the ground or into water.

The invention may be embodied in other specific forms without departing from the spirit or essential characteristics of the invention. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

I claim:

1. A target and retrieval device comprising:
   a main body portion formed of a durable material, the length and circumference of said main body portion being dimensioned to be releasably grasped within the mouth of a dog; and
   a secondary body portion secured to said main body portion, whereby said secondary body portion is adapted to provide a visible signal when contacted by a shot from a gun, and said main body portion survives the shot and is retrievable.

2. The device of claim 1, wherein said secondary body portion comprises a material which will break when contacted by said gun shot.

3. The device of claim 2, wherein said secondary body portion contains a powder.

4. The device of claim 2, wherein said secondary body portion is an inflatable balloon.

5. The device of claim 4, wherein said inflatable balloon contains a powder.

6. The device of claim 2, wherein said material is clay.

7. The device of claim 2, wherein said secondary body portion comprises a clay target and a clay target holder.

8. The device of claim 1, wherein said secondary body is adapted to be frictionally securable to said main body portion.

9. The device of claim 8, wherein said secondary body is formed generally in the shape of a toroid.

10. The device of claim 1, wherein said main body portion is formed into the shape of a game bird.

11. The device of claim 1, wherein said main body portion includes a launch tube adapted to permit said device to be launched by a power launcher.

12. The device of claim 1, further including a length of rope affixed to said main body portion for throwing said target and retrieval device.

13. The device of claim 1, wherein said main body portion is formed of a durable, mouldable foamed polyurethane material.

14. A target and retrieval device comprising:
a main body portion formed of a durable material, the length and circumference of said main body portion being dimensioned to be releasably grasped within the mouth of a dog; and
a secondary body portion closely secured to said main body portion, wherein said secondary body portion comprises a material which will break when contacted by a shot from a gun, thus providing a visible signal, and said main body portion survives the shot and is retrievable.

15. The device of claim 14, wherein said secondary body portion contains a powder.

16. The device of claim 14, wherein said secondary body portion is an inflatable balloon.

17. The device of claim 16, wherein said inflatable balloon contains a powder.

18. The device of claim 14, wherein said material is clay.

19. The device of claim 14, wherein said secondary body portion comprises a clay target and a clay target holder.

20. The device of claim 14, wherein said secondary body portion is adapted to be frictionally securable to said main body portion.

21. The device of claim 20, wherein said secondary body portion is formed generally in the shape of a toroid.

22. The device of claim 14, wherein said main body portion is formed into the shape of a game bird.

23. The device of claim 14, wherein said main body portion includes a launch tube adapted to permit said device to be launched by a power launcher.

24. The device of claim 14, further including a length of rope affixed to said main body portion for throwing said target and retrieval device.

25. The device of claim 14, wherein said main body portion is formed of a durable, mouldable foamed polyurethane material.

26. A method for training a hunter and a retrieving dog together in a simulated real-life hunting experience comprising the steps of:
providing a target and retrieval device comprising:
a main body portion formed of a durable material, the length and circumference of said main body portion being dimensioned to be releasably grasped within the mouth of a dog; and
a secondary body portion affixed to said main body portion, said secondary body portion adapted to provide a visible signal when contacted by a shot from a gun, and said main body portion able to survive the shot and be retrievable;
throwing or launching said target and retrieval device;
shooting at said target and retrieval device with a gun so as to cause
said secondary body portion to provide said visual signal when successfully hit by said gun shot; and
causing said main body portion to be retrieved.

27. The method of claim 26, wherein said secondary body portion comprises a material which will break when contacted by said gun shot.

28. The method of claim 27, wherein said secondary body portion contains a powder.

29. The method of claim 27, wherein said secondary body portion is an inflatable balloon.

30. The method of claim 29, wherein said inflatable balloon contains a powder.

31. The method of claim 27, wherein said material is clay.

32. The method of claim 27, wherein said secondary body portion comprises a clay target and a clay target holder.

33. The method of claim 26, wherein said secondary body is adapted to be frictionally securable to said main body portion.

34. The method of claim 33, wherein said secondary body is formed generally in the shape of a toroid.

35. The method of claim 26, wherein said main body is formed into the shape of a game bird.

36. The method of claim 26, wherein said main body portion includes a launch tube adapted to permit said device to be launched by a power launcher.

37. The method of claim 26, wherein said main body includes a length of rope affixed thereto for throwing said target and retrieval device.

38. The method of claim 26, wherein said main body portion is formed of a durable, mouldable foamed polyurethane material.

* * * * *